US011599205B2

(12) United States Patent
Riddick et al.

(10) Patent No.: US 11,599,205 B2
(45) Date of Patent: Mar. 7, 2023

(54) METHODS AND SYSTEMS FOR HANDSETS FOR TESTING DEVICES WITH FLUID INGRESS MITIGATION

(71) Applicant: ILLINOIS TOOL WORKS INC., Glenview, IL (US)

(72) Inventors: Adrian Riddick, Medfield, MA (US); Daniel Chouinard, North Attleboro, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 63 days.

(21) Appl. No.: 17/036,723

(22) Filed: Sep. 29, 2020

(65) Prior Publication Data

US 2021/0096662 A1   Apr. 1, 2021

Related U.S. Application Data

(60) Provisional application No. 62/907,972, filed on Sep. 30, 2019.

(51) Int. Cl.
*G06F 3/033* (2013.01)
*G06F 3/0338* (2013.01)
*G01L 5/00* (2006.01)

(52) U.S. Cl.
CPC .............. *G06F 3/0338* (2013.01); *G01L 5/00* (2013.01); *G06F 3/033* (2013.01)

(58) Field of Classification Search
None
See application file for complete search history.

(56) References Cited

U.S. PATENT DOCUMENTS

| 5,117,074 A * | 5/1992 | Yanai | H01H 9/04 200/302.1 |
|---|---|---|---|
| 5,448,240 A * | 9/1995 | Morito | G06F 3/0312 174/561 |
| 2006/0132347 A1* | 6/2006 | Hanahara | G08C 17/02 341/176 |
| 2008/0128256 A1* | 6/2008 | Koizumi | H01H 9/0235 200/534 |
| 2017/0038880 A1* | 2/2017 | Kinzer | G06F 3/0487 |

FOREIGN PATENT DOCUMENTS

| DE | 102009050373 | 4/2011 | |
|---|---|---|---|
| EP | 0531829 | 3/1993 | |
| WO | WO-2011048218 A1 * | 4/2011 | ............. G08C 17/02 |

OTHER PUBLICATIONS

International Search Report and Written Opinion for PCT/US2020/053408, dated Jan. 25, 2021, 14 pages.

* cited by examiner

*Primary Examiner* — Xuyang Xia
(74) *Attorney, Agent, or Firm* — McAndrews, Held & Malloy, Ltd.

(57) ABSTRACT

Systems and methods are provided for handsets for testing devices with fluid ingress mitigation.

18 Claims, 8 Drawing Sheets

METHODS AND SYSTEMS FOR HANDSETS FOR TESTING DEVICES WITH FLUID INGRESS MITIGATION

CLAIM OF PRIORITY

This patent application makes reference to, claims priority to and claims benefit from U.S. Provisional Patent Application Ser. No. 62/907,972, filed on Sep. 30, 2019. The above identified application is hereby incorporated herein by reference in its entirety.

BACKGROUND

This disclosure relates generally to mechanical testing, and more particularly, to handset for testing devices with fluid ingress mitigation. Further limitations and disadvantages of conventional approaches will become apparent to one management of skill in the art, through comparison of such approaches with some aspects of the present method and system set forth in the remainder of this disclosure with reference to the drawings.

BRIEF SUMMARY

Aspects of the present disclosure relate to testing solutions and systems for use in conjunction therewith. More specifically, various implementations in accordance with the present disclosure are directed to methods and systems for handset for testing devices with fluid ingress mitigation, substantially as illustrated by or described in connection with at least one of the figures, and as set forth more completely in the claims.

These and other advantages, aspects and novel features of the present disclosure, as well as details of an illustrated implementation thereof, will be more fully understood from the following description and drawings.

DETAILED DESCRIPTION

Various implementations in accordance with the present disclosure are directed to providing enhanced and optimized testing solutions, including destructive testing and non-destructive testing (NDT) inspections, particularly by implementing and operating testing setups with handsets with fluid ingress mitigation.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As used herein, the term "mitigation" as it is used with reference to fluid ingress refers to reduction and/or containment of fluid ingress, and/or to reduction or prevention of damage caused by fluid ingress.

Figure 1:
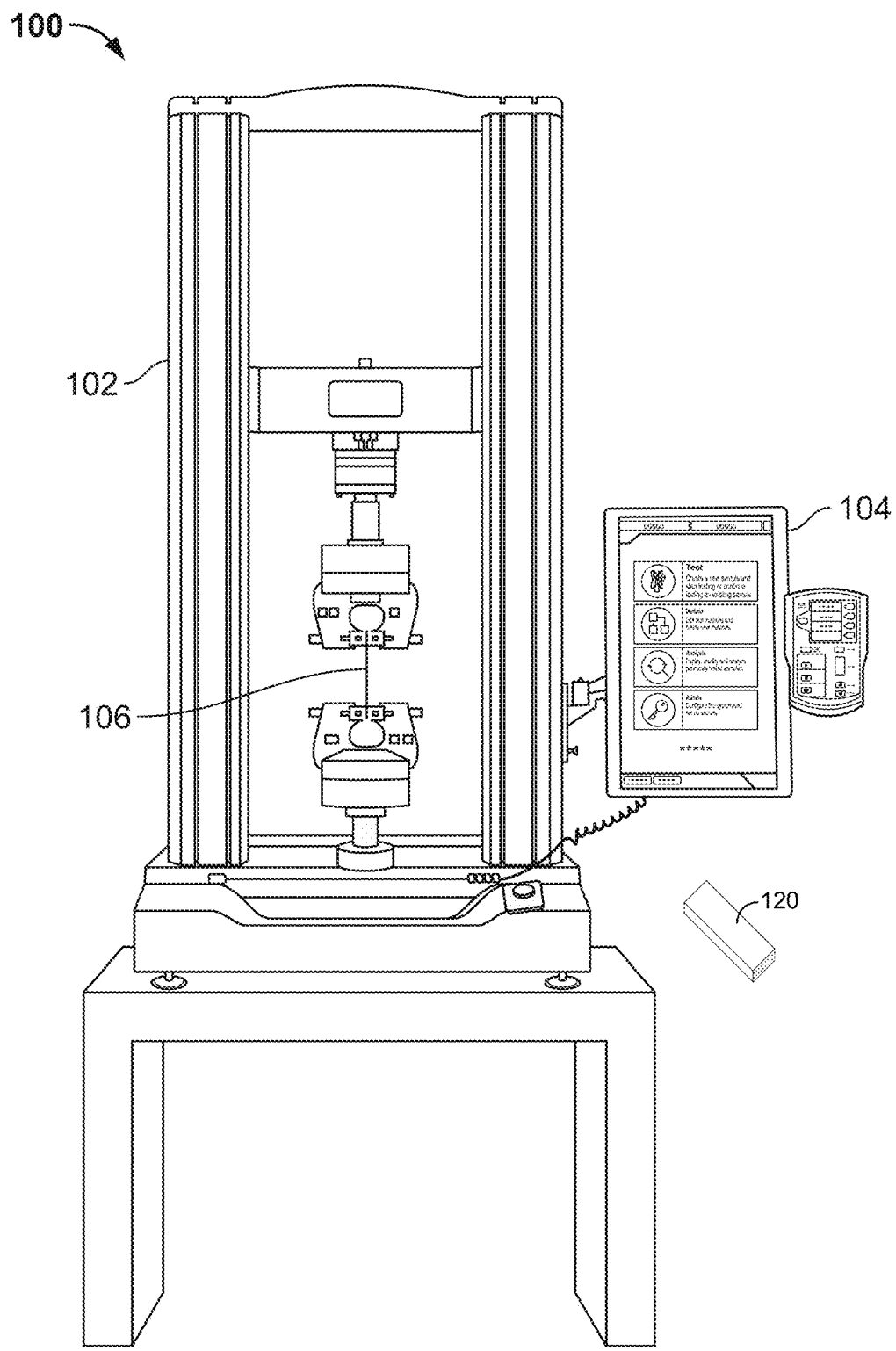
FIG. 1 is an example testing device to perform mechanical testing.

FIG. 1 is an example testing device to perform mechanical testing. Shown in FIG. 1 is an example testing device 100 that may be configured to perform mechanical property testing.

The example testing device 100 may be, for example, a universal testing system capable of static mechanical testing. The testing device 100 may perform, for example, compression strength testing, tension strength testing, shear strength testing, bend strength testing, deflection strength testing, tearing strength testing, peel strength testing (e.g., strength of an adhesive bond), and/or any other compressive, tensile, torsion, thermal, and/or impact testing. Additionally or alternatively, the testing device 100 may perform dynamic testing.

The example testing device 100 includes a test fixture 102 and a computing device 104 communicatively coupled to the test fixture 102. The test fixture 102 applies loads to a material under test 106 and measures the mechanical properties of the test, such as displacement of the material under test 106 and/or force applied to the material under test 106.

The example computing device 104 may be used to configure the test fixture 102, control the test fixture 102, and/or receive measurement results from the test fixture 102 for processing, display, reporting, and/or any other desired purposes.

In some implementations, a handset 120 may be used in conjunction with operation of the testing device 100. In this regard, the handset 120 may be configured to enable an operator of the testing device 100 to provide input during operations of the testing device 100, e.g., without needing to interact directly with the computing device 104. Use of handsets may pose some challenges, however.

For example, handsets (e.g., the handset 120) may be susceptible to conditions in the testing environment that may damage the handset 120, particularly internal components thereof (e.g., circuitry, hardware corresponding to components of the handset, such as buttons or other input components, etc.). In particular, fluids or liquids (e.g., water) that may be present in the testing environment may pose such risks, as the fluids may get into the interior of the handset 120, and possibly damage or otherwise degrade internal components of the handset.

Implementations in accordance with the present disclosure incorporate solutions for mitigating such risks posed to use of handsets in testing environment. In particular, in various implementations in accordance with the present disclosure, handsets configured for use in testing arrangement incorporate optimized measures for mitigating the risks posed by such conditions as the presence of fluids in testing environments, and specifically doing so in cost effective manner. Example handsets are described below.

Figure 2:
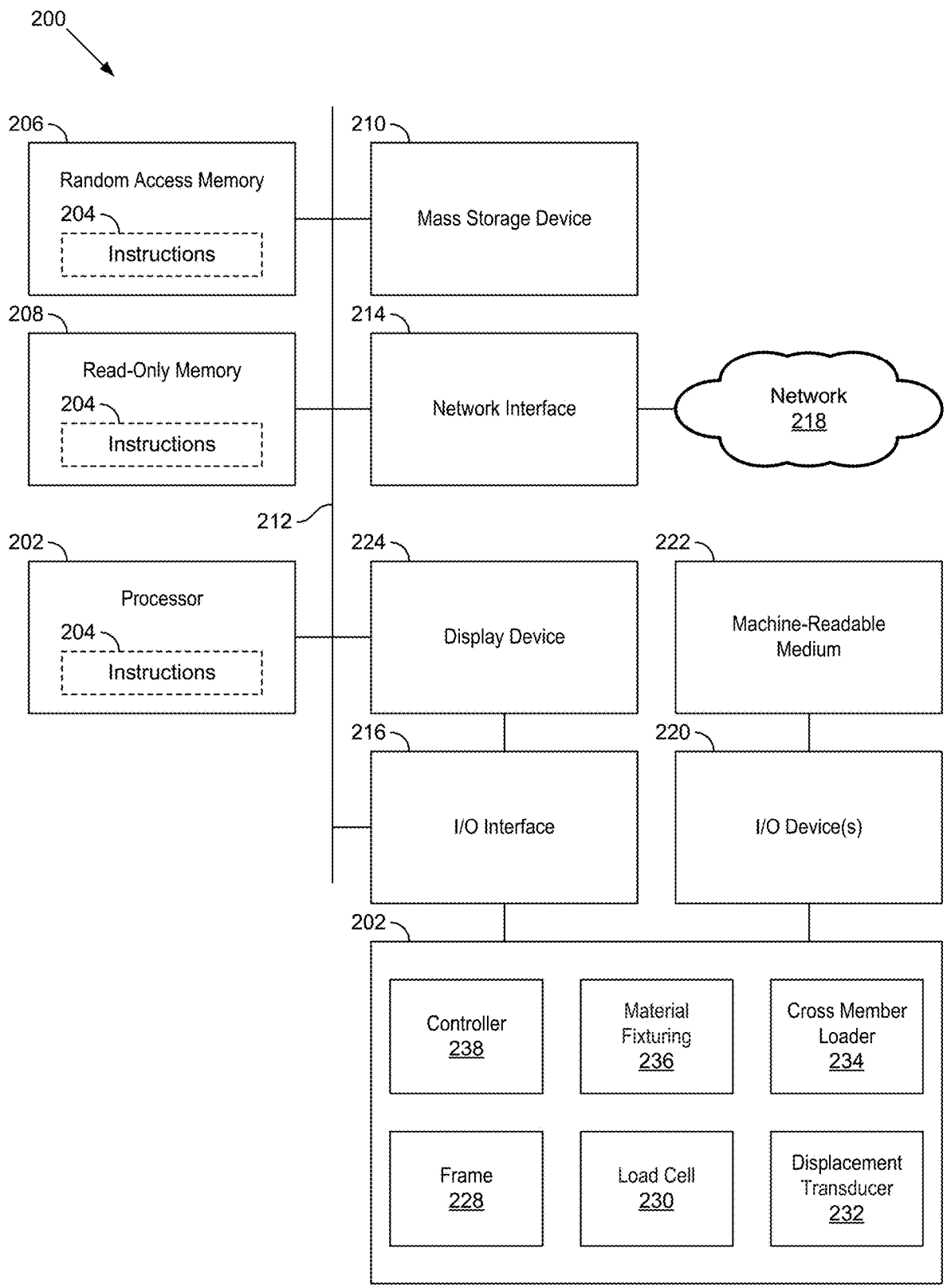
FIG. 2 is a block diagram of an example implementation of the testing device of FIG. 1.

FIG. 2 is a block diagram of an example implementation of the testing device of FIG. 1. Shown in FIG. 2 is a block diagram of an example computing system 200 that may be used to implement the testing device 100 of FIG. 1.

The example testing device 100 includes the test fixture 102 and the computing device 104. The example computing device 104 may be a general-purpose computer, a laptop computer, a tablet computer, a mobile device, a server, an all-in-one computer, and/or any other type of computing device.

The example computing system 200 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing system 200 to a communications network 218 such as the Internet. For example, the network interface 214 may include IEEE 802.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example testing device 100 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing system 200 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The example testing device 100 of FIG. 1 further includes the test fixture 102 coupled to the computing system 200. In the example of FIG. 2, the test fixture 102 is coupled to the computing device via the I/O interface 216, such as via a USB port, a Thunderbolt port, a FireWire (IEEE 1394) port, and/or any other type serial or parallel data port. In some other examples, the test fixture 102 is coupled to the network interface 214 via a wired or wireless connection, either directly or via the network 218.

The test fixture 102 of FIG. 2 includes a frame 228, a load cell 230, a displacement transducer 232, a cross member loader 234, material fixtures 236, and a controller 238. The test fixture 102 may include any number of other transducers, based on the type(s) of mechanical tests that the test fixture 102 is capable of performing. Other test fixtures may be dynamic test fixtures and/or include different test equipment, while including appropriate transducers that produce test data and may be controlled via the computing device 104.

The frame 228 provides rigid structural support for the other components of the test fixture 102 that perform the test. The load cell 230 measures force applied to a material under test by the cross-member loader 234 via the material fixtures 236. The cross-member loader 234 applies force to the material under test, while the material fixtures 236 (e.g., grips or similar) grasp or otherwise couple the material under test to the cross-member loader 234. Example material fixtures 236 include grips, jaws, jigs, anvils, compression platens, or other types of fixtures, depending on the mechanical property being tested and/or the material under test.

The example controller 238 communicates with the computing device 104 to, for example, receive test parameters from the computing device 104 and/or report measurements and/or other results to the computing device 104. For example, the controller 238 may include one or more communication or I/O interfaces to enable communication with the computing device 104. The controller 238 may control the cross-member loader 234 to increase or decrease applied force, control the fixture(s) 236 to grasp or release a material under test, and/or receive measurements from the displacement transducer 232, the load cell 230, and/or any other transducer(s).

Figure 3:
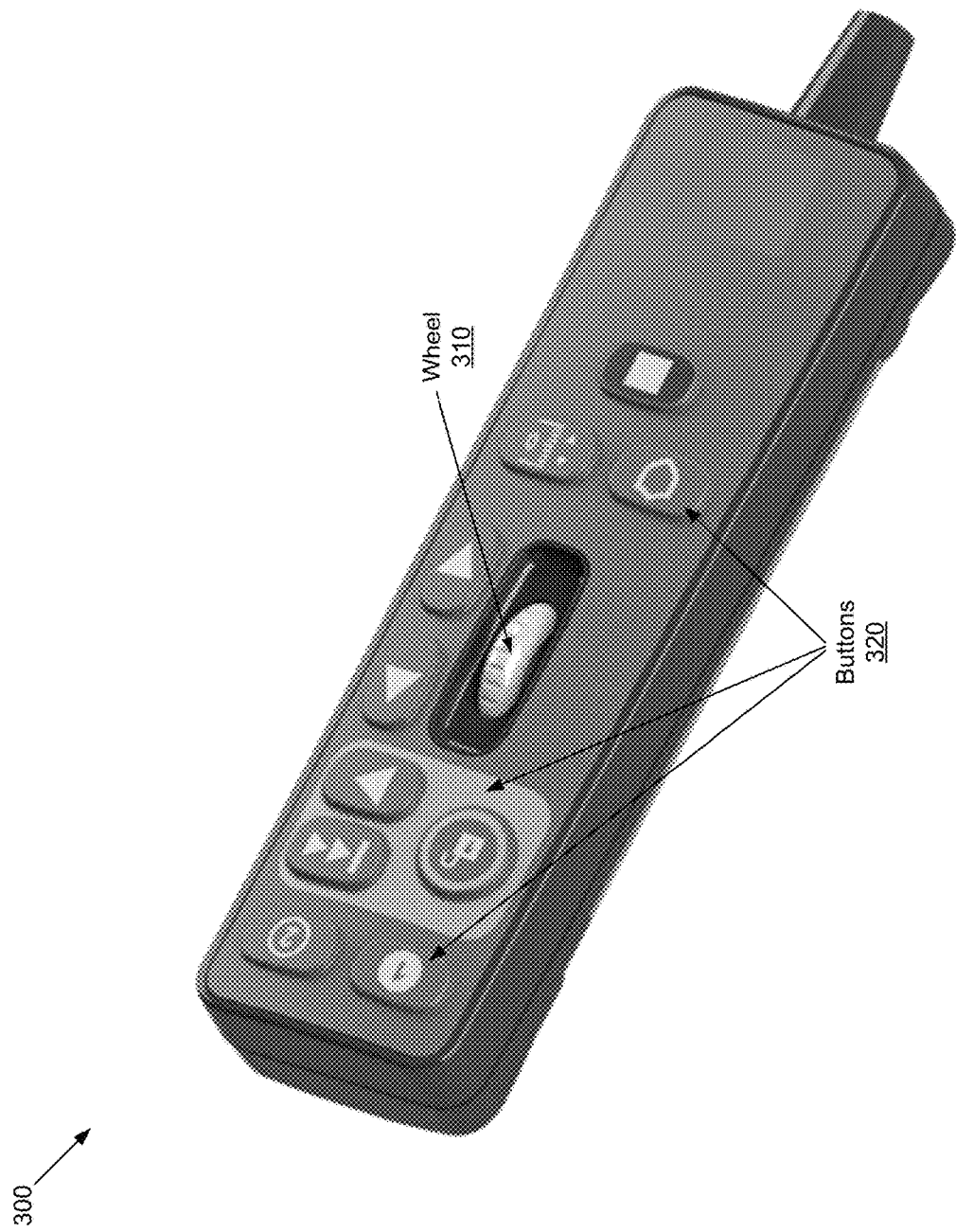
FIG. 3 illustrates an example handset that incorporates measures for mitigating fluids ingress, in accordance with aspects of this disclosure.

FIG. 3 illustrates an example handset 300 that incorporates measures for mitigating fluids ingress, in accordance with aspects of this disclosure. Shown in FIG. 3 is a handset 300.

The handset 300 may be configured for use in conjunction with a particular system (or device), such as to enable an operator of the system to control at least some of the operations of the system. The handset 300 may correspond to, e.g., the handset 120 of FIG. 1, which is configured for use in conjunction with operation of the testing device 100.

In this regard, the handset 300 may comprise input components or elements, which the operator may use to provide input that would be applied to the system in conjunction with which the handset 300 is used. For example, as shown in FIG. 3, the handset 300 may comprise a wheel (or wheel-like) input component 310 and buttons (or button-like) input elements 320. In this regard, the buttons may be used to allow the user to provide input by pressing the buttons 320 to, e.g., activate or deactivate a corresponding function, or by rotating the wheel 310 to provide varied input (e.g., increasing or decreasing value of particular parameters within a pre-set range). In addition to these elements, the handset 300 may comprise additional components (not shown). For example, enclosed within the interior space(s) of the handset 300 may be suitable components for facilitating operation of the input elements. These components may comprise driving mechanism (e.g., for the wheel 310), circuitry for generating control signals based on interaction with the input elements, circuitry and/or other hardware for supporting such functions as power, communication, etc.

However, as noted above use of handsets may pose some challenges. In particular, the handset 300 (or similar handsets) may be susceptible to conditions in the testing environment that may damage the handset 300, and/or components thereof (e.g., circuitry, hardware, etc.). In particular, fluids (e.g., water) that may be present in the environment where the handset is used may pose such risks, as the fluids may get into the interior of the handset 300, and possibly damage or otherwise degrade internal components of the handset. Accordingly, the example handset 300 is configured for handling such risks, particularly fluid ingress.

In particular, the handset 300 of FIG. 3 incorporates measure(s) for preventing fluid ingress and/or for mitigating any fluid ingress that may occur. For example, the handset 300 may incorporate a fluid-proof overlay (e.g., elastomer overlay) that integrates at least some of the input elements (e.g., the buttons 320) to enable interactions with the button in a manner that does not create opening(s) into the interior of the handset 300.

Additionally or alternatively, for input elements that may be compatible with such design—e.g., the wheel 310, which may necessarily create an opening into the interior of the handset 300, additional measures are used to mitigate any fluid ingress. In this regard, as noted above, the terms "mitigation" or "mitigating" as used with reference to fluid ingress refer to reduction and/or containment of fluid ingress, and/or to reduction or prevention of damage caused by fluid ingress. In other words, mitigating fluid ingress does not require or entail preventing fluid ingress completely. Rather, mitigation measures allow for containing and controlling the fluid ingress to prevent any fluids that ingress into a particular internal space (or chamber) within the handset from getting or flowing into other internal chambers in the handset, particularly ones housing other components handset—e.g., circuitry, movement mechanism, etc. Thus, the handset may remain operational without requiring that every internal space or chamber therein be impervious to fluid entry.

For example, the bottom section of the handset 300 may incorporate holes opposite of the wheel 310, such that any ingress fluid may flow out (e.g., using force of gravity). Further, the space that encloses the wheel 310 may incorporate sealing feature to prevent any ingress fluids from leaking into surrounding internal space(s). The example mitigation features are cost effective, and particularly compared with conventional solutions such as completely sealing the wheel against fluid ingress. Example solutions are shown in more detail in FIGS. 4 and 5.

Figure 4:
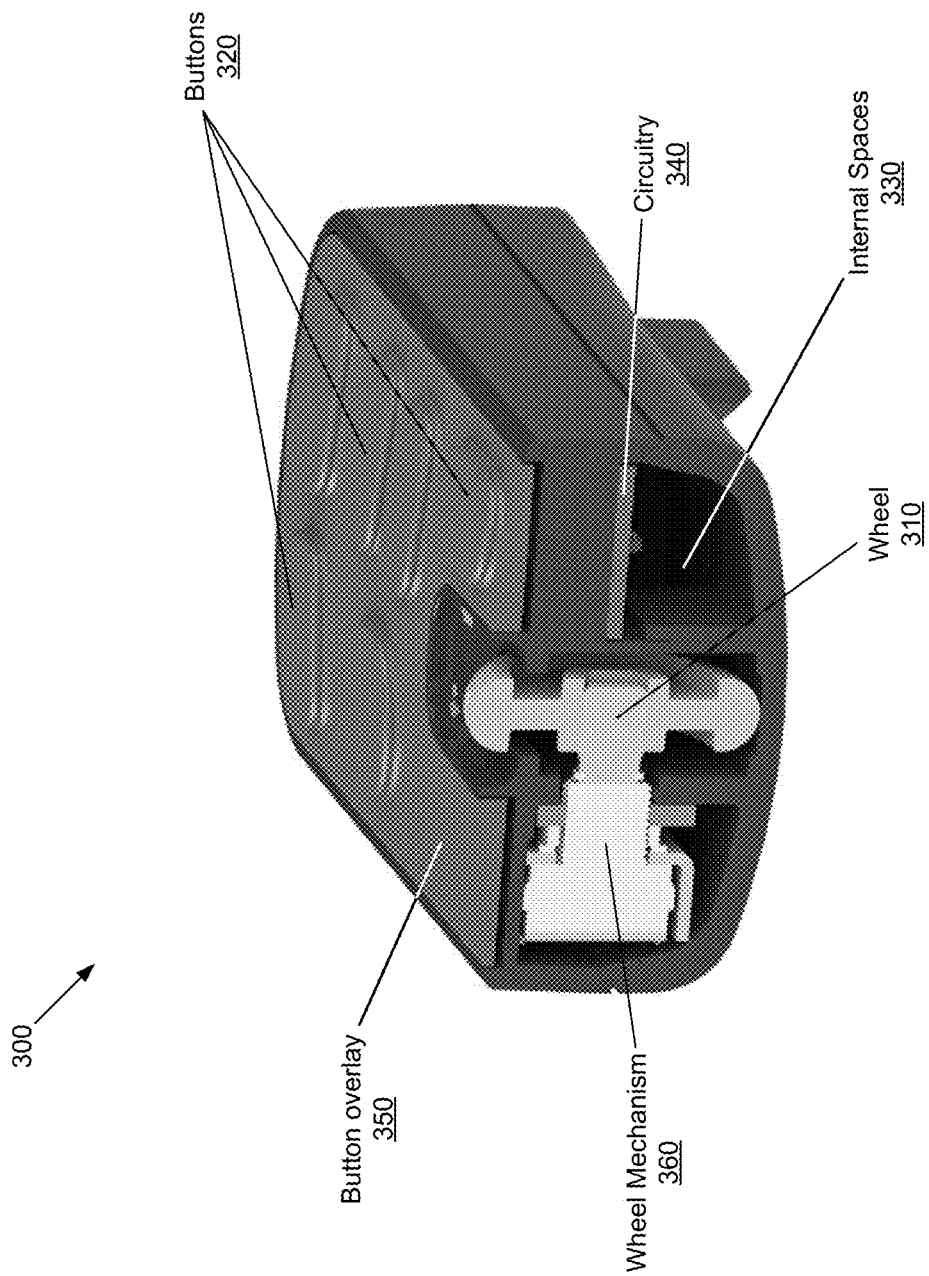
FIG. 4 illustrates a cross-section of the handset of FIG. 3, showing some of the measures incorporated therein for mitigating fluids ingress.

FIG. 4 illustrates a cross-section of the example handset 300 of FIG. 3, showing some of the measures incorporated therein for mitigating fluids ingress.

In particular, illustrated in FIG. 4 is a cross-section of the handset 300, along its width, at the location of the wheel 310, to show various features of the handset 300. For example, as shown in FIG. 4, the handset 300 may include internal spaces 330, where internal component, such as circuitry 340 (e.g., circuitry for controlling power and/or communication functions of the handset 300, circuitry for control operation of the input elements—e.g., generating control signal based on interactions with the buttons 320 and/or the wheel 310, etc.), other hardware (e.g., driving mechanisms, such as wheel mechanism 360, which is configured for facilitating rotation of the wheel 310, as well as (optionally) for generating sensory information corresponding to such rotation), etc.

The internal spaces 330 may be created, e.g., when the handset 300 is made or formed. For example, the handset 300 may comprise separate (physical) top and bottom sections, each having corresponding protrusions such as when the top section and the bottom section are engaged to create the handset 300, they would define one or more internal spaces 330, which may be used in housing internal components of the handset 300. Nonetheless, the disclosure is not limited to such implementations (e.g., with multiple sections, such as top and bottom sections), and as such the solutions described herein may similarly be applied to handsets having a single housing with internal chamber(s) therein.

Also illustrated in the cross-section of the handset 300 are various fluid ingress prevention and/or mitigation features incorporated into the handset 300. In particular, as shown in FIG. 4, the buttons 320 are incorporated into a button overlay 350 that is configured for preventing fluid ingress at areas corresponding to the buttons 320. The button overlay 350 may be made of, e.g., elastomeric material, which may be particularly suitable for resisting fluid ingress while allowing desirable button "feel" for the areas corresponding to the buttons 320. The disclosure is not limited to such material, however, and other suitable material may be used.

The button overlay 350 may cover or extend over most of the top surface of the handset 300, to maximize resistance to fluid ingress. However, some areas may not be covered, such as the areas where the wheel 310 is located, as the button overlay 350 (or other fluid-proof overlay material) may not cover or extend over such areas. Fluid ingress may potentially occur via any openings onto the interior of the handset 300 at such areas. For example, there may be some space (separation) around the wheel 310 on the top surface of the handset 300, through which fluids may leak into the interior of the handset 300.

Such fluid ingress may pose risk to components within the handset 300. For example, fluids that may ingress through space around the wheel 310 on the top surface of the handset 300 may flow downward, and if not handled, may leak into the internal spaces 330, which may eventually damage or otherwise degrade operation of internal components within these spaces, such as the circuitry 340, the wheel mechanism 360, etc. Accordingly, the handset 300 may incorporate additional measure for mitigating any possible fluid ingress. Examples of such features are shown in FIG. 5.

Figure 5:
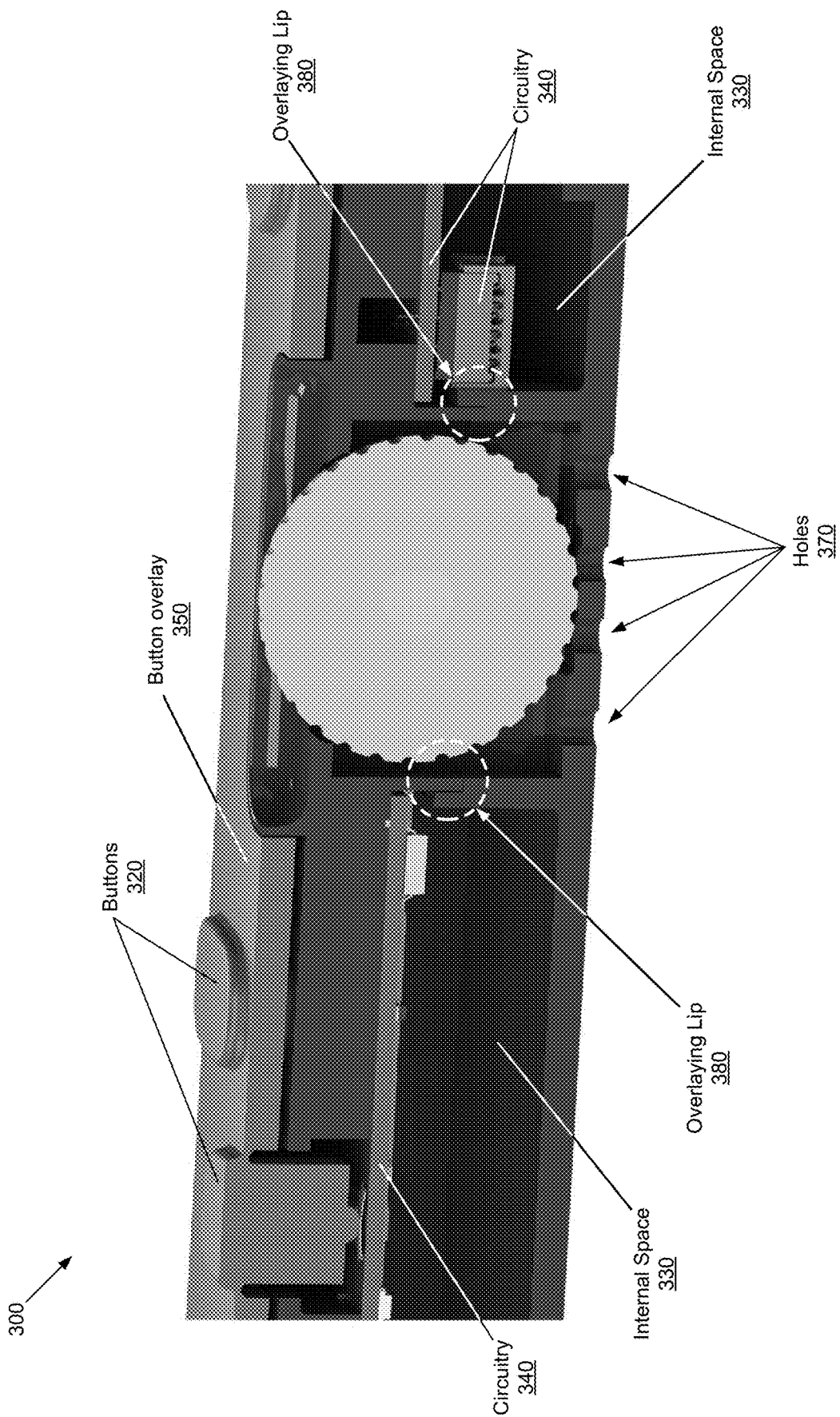
FIG. 5 illustrates another cross-section of the handset of FIG. 3, showing some of the measures incorporated therein for mitigating fluids ingress.

FIG. 5 illustrates another cross-section of the handset of FIG. 3, showing some of the measures incorporated therein for mitigating fluids ingress. Shown in FIG. 5 is the handset 300, as described with respect to FIG. 3.

In particular, illustrated in FIG. 5 is a cross-section along the length of the handset 300, through the wheel 310, to show various features of the handset 300. For example, as shown in FIG. 4, the handset 300 may include internal spaces 330, where internal component, such as circuitry 340 (e.g., circuitry for controlling power and/or communication functions of the handset 300, circuitry for control operation of the input elements—e.g., generating control signal based on interactions with the buttons 320 and/or the wheel 310, etc.), other hardware (e.g., driving mechanisms, such as wheel mechanism 360, which is configured for facilitating rotation of the wheel 310, as well as (optionally) for generating sensory information corresponding to such rotation), etc.

In particular, illustrated in the cross-section of the handset 300 shown in FIG. 5 are various fluid ingress prevention and/or mitigation features incorporated into the handset 300. In this regard, in addition to the button overlay 350, which may be used to prevent fluid ingress, the handset 300 also incorporate fluid ingress mitigation features that mitigate any fluid ingress that may occur via openings/spaces on the outside (particularly top-side) of the handset 300, such as around the wheel 310.

For example, the internal space 330 (e.g., wheel well) that houses the part of the wheel 310 that is within the handset 300 (to allow coupling it to the wheel mechanism 360) may incorporate holes 370 in the bottom to allow any fluid that leaks into that space to flow out of the handset 300, using, e.g., forces of gravity. Further, for enhanced performance—in terms of fluid ingress mitigation—the handset 300 may incorporate additional measures. For example, as noted above, the handset 300 may comprise two sections (top section and bottom section) that comprise corresponding protrusions that line up with each other such that when the sections are engaged, they created the internal spaces 330.

Thus, to further protect against any leaking of fluid that ingresses into the interior of the handset, edges around the internal spaces where such ingress may occur may incorporate engagement features that are particularly suited for mitigating any fluid leakage onto adjacent interior spaces—e.g., overlaying lips 380 that are configured in a manner that prevent such leakage, as shown in FIG. 5. In some instances, the same engaging feature may be used in the whole handset 300, including external edges of the top and bottom sections. Further, in some instances, a seal may be applied in some of the internal edges (protrusion within the handset) and/or external edges (of the top and bottom sections) at areas that are particularly susceptible to fluid ingress.

Figure 6:
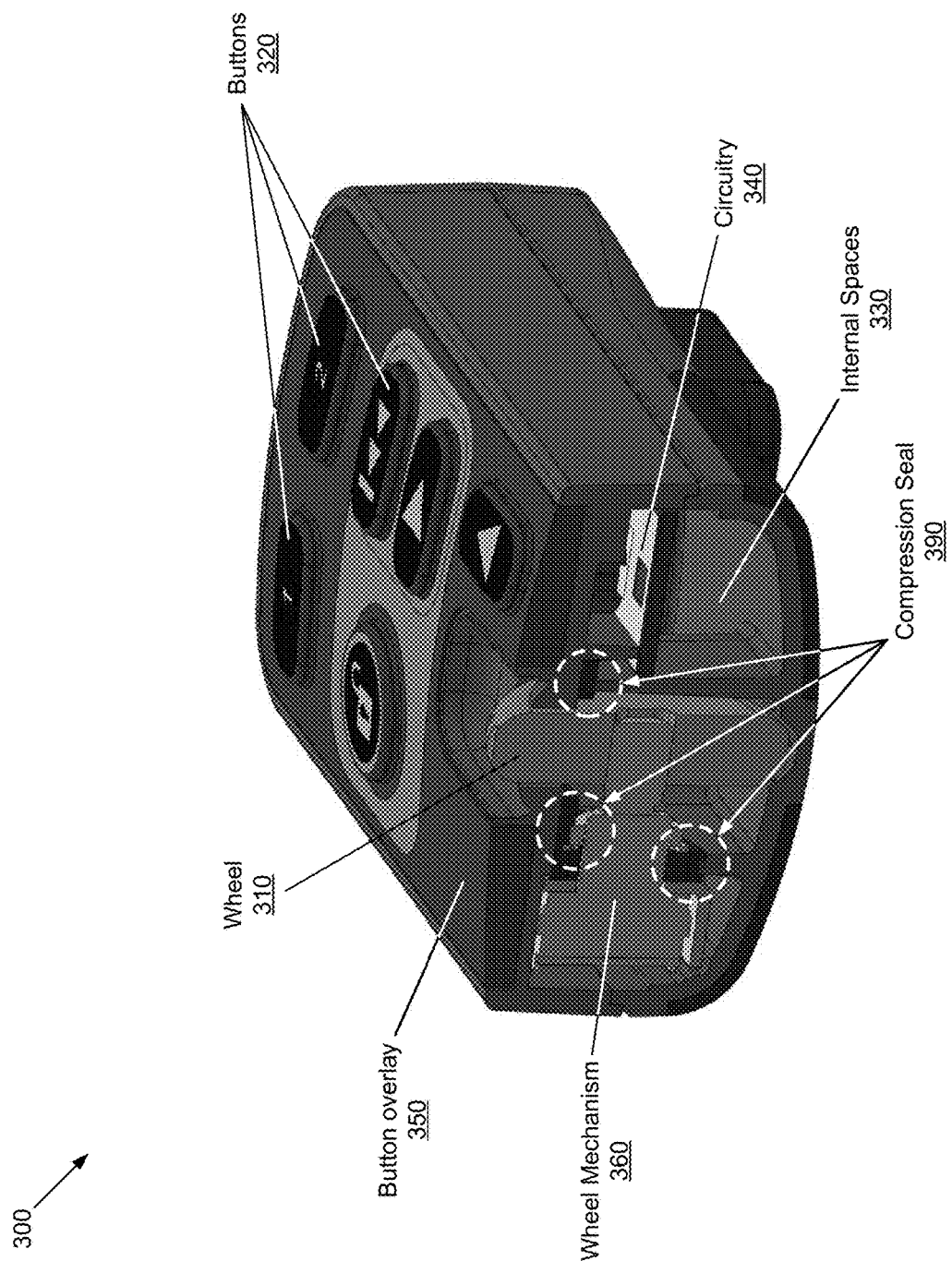
FIG. 6 illustrates a cross-section of the handset of FIG. 3, showing measures incorporated therein for mitigating fluids ingress in accordance with an alternative design.

FIG. 6 illustrates a cross-section of the handset of FIG. 3, showing measures incorporated therein for mitigating fluids ingress in accordance with an alternative design.

In particular, illustrated in FIG. 6 is a cross-section of the handset 300, along its width, at the location of the wheel 310, to show various features of the handset 300. In this regard, as noted with respect to FIG. 4, the handset 300 may include internal spaces 330, where internal component, such as the circuitry 340 and other hardware (e.g., the wheel mechanism 360) may be housed.

As noted, the internal spaces 330 may be created, e.g., when the handset 300 is made or formed. For example, the handset 300 may comprise separate (physical) top and bottom sections, each having corresponding protrusions such as when the top section and the bottom section are engaged to create the handset 300, they would define one or more internal spaces 330, which may be used in housing internal components of the handset 300.

As illustrated in FIG. 6, the handset 300 incorporates various fluid ingress prevention and/or mitigation features in accordance with an alternative design than that shown and described with respect to FIGS. 4 and 5. In this regard, the handset 300, as shown in the implementation illustrated in FIG. 6, may retain use of the button overlay 350, which is configured for preventing fluid ingress at areas corresponding to the buttons 320, as described above. Further, the handset 300, as shown in the implementation illustrated in FIG. 6, may retain use of holes 370 for draining fluids that may ingress around the wheel 310.

Figure 7:
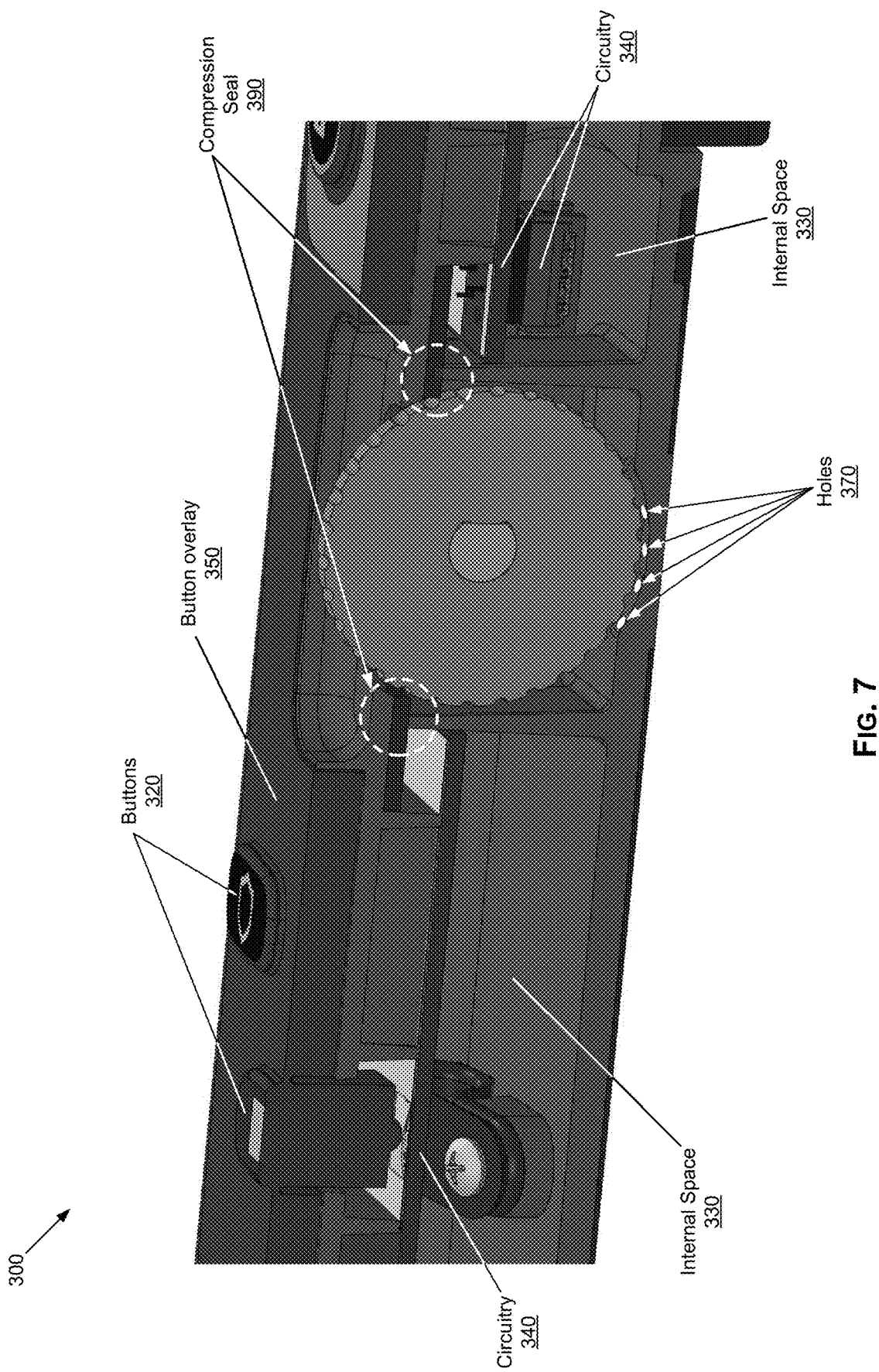
FIG. 7 illustrates another cross-section of the handset of FIG. 3, showing some of the measures incorporated therein for mitigating fluids ingress in accordance with the alternative design illustrated in FIG. 6.

However, rather, than utilizing overlaying lips within the handset to prevent or mitigate fluid leakage within the handset—that is, from one internal space onto adjacent interior space(s), the handset 300 as illustrated in FIGS. 6 and 7 may incorporate use of a compression seal 390, with rubber gaskets. In this regard, rather than designing the top section and bottom section of the handset 300 with overlaying lips, as described with respect to FIG. 5, the compression seal 390 may be used to create a seal at contact points or surfaces between the top section and bottom section. The compression seal 390 may be made of, e.g., elastomeric material, which may be particularly suitable for resisting fluid ingress.

Thus, incorporating the compression seal 390 between corresponding edges on the top section and bottom section prevents fluid movement between two adjacent spaces separated by these corresponding edges. In some instances, the compression seal 390 may be used in the whole handset 300—that is, for sealing contact points and/or surfaces between all edges of the top section and the bottom section of the handset, including external edges. Alternatively, the compression seal 390 may only be used for sealing internal spaces that are particularly susceptible to fluid ingress, such as around the wheel 310. Use of the compression seal 390 around the wheel 310 is further illustrated in FIG. 7.

FIG. 7 illustrates another cross-section of the handset of FIG. 3, showing some of the measures incorporated therein for mitigating fluids ingress in accordance with the alternative design illustrated in FIG. 6.

In particular, illustrated in FIG. 7 is a cross-section along the length of the handset 300, through the wheel 310, to show various features of the handset 300. For example, as shown in FIG. 6, the handset 300 may include internal spaces 330, where internal components, such as the circuitry 340, other hardware (e.g., driving mechanisms), etc. may be housed.

In particular, illustrated in the cross-section of the handset 300 shown in FIG. 7 are various fluid ingress prevention and/or mitigation features incorporated into the handset 300. In this regard, in addition to the button overlay 350, which may be used to prevent fluid ingress, the handset 300 also incorporate fluid ingress mitigation features that mitigate any fluid ingress that may occur via openings/spaces on the outside (particularly top-side) of the handset 300, such as around the wheel 310.

For example, the internal space 330 (e.g., wheel well) that houses the part of the wheel 310 that is within the handset 300 (to allow coupling it to the wheel mechanism 360) may incorporate holes 370 in the bottom to allow any fluid that leaks into that space to flow out of the handset 300, using, e.g., forces of gravity. Further, for enhanced performance—in terms of fluid ingress mitigation—the handset 300 may incorporate additional measures. For example, as noted above, the handset 300 may comprise two sections (top section and bottom section) that comprise corresponding protrusions that line up with each other such that when the sections are engaged, they created the internal spaces 330.

To further protect against any leaking of fluid that ingresses into the interior of the handset, the compression seal 390 may be used. In this regard, the compression seal 390 may be used to seal edges around the space housing the wheel 310, where such ingress may occur. Additional features may be used to further enhance fluid ingress mitigation, as described with respect to FIG. 8.

Figure 8:
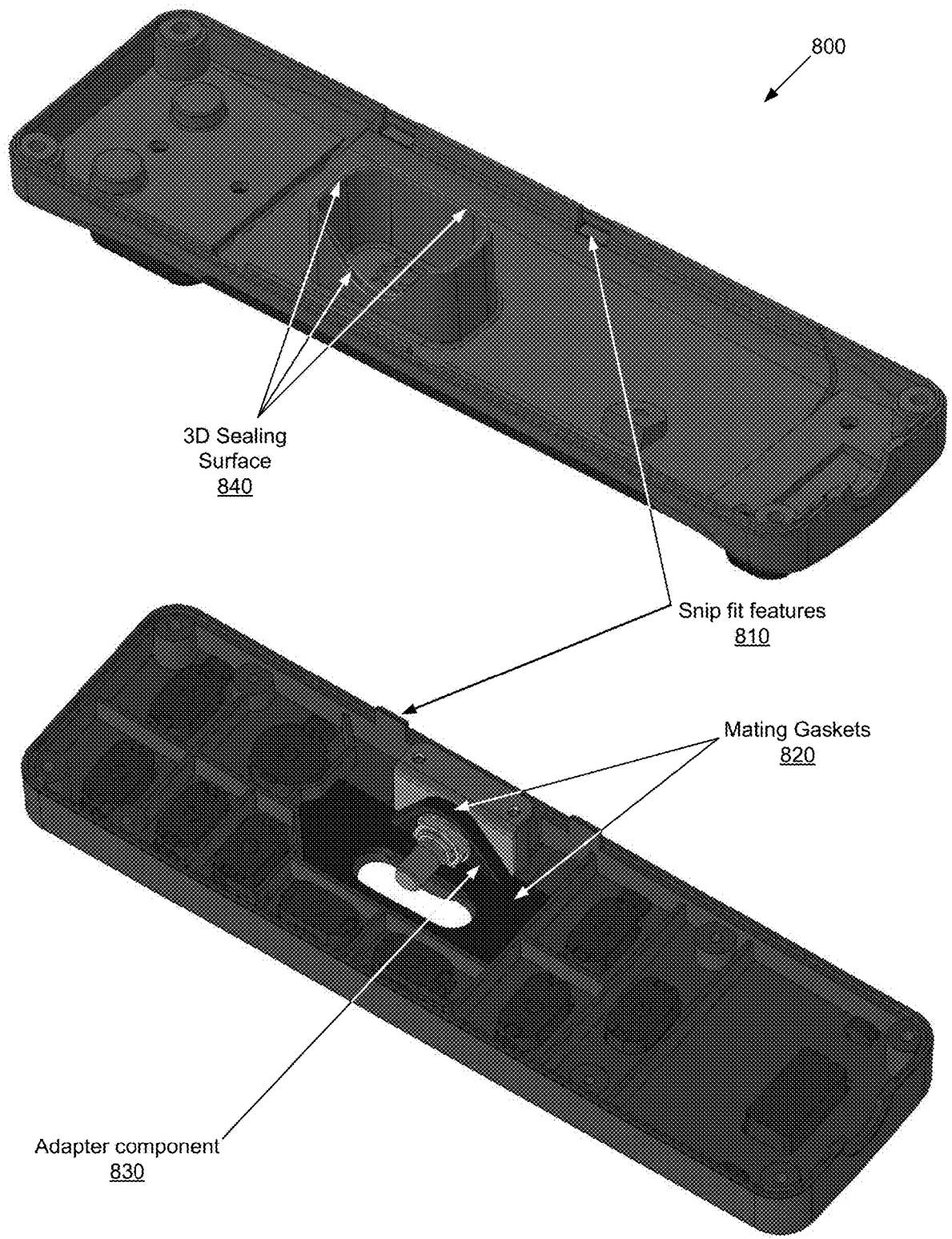
FIG. 8 illustrates top and bottom sections of a handset that incorporates gasket based features for mitigating fluids ingress.

FIG. 8 illustrates top and bottom sections of a handset that incorporates gasket based features for mitigating fluids ingress. Shown in FIG. 8 are top section and bottom section of handset 800 configured for mitigating fluids ingress.

In particular, the handset 800 (or the top section and the bottom section thereof) incorporate gasket related features, for supporting use of compression seal as described with respect to FIGS. 6 and 7, particularly around the wheel. For example, the handset 800 may incorporate mating gaskets 820, which may be installed in the top section of the handset 800, being configured to mate with corresponding three-dimensional (3D) sealing surface 840 molded into the bottom section of the handset 800, thus creating a sealed well where the wheel may be housed. Further, an adapter component 830 may be used mounted onto the side surface of the mechanism driving the wheel (i.e., the wheel mechanism), to complete forming of mating 3D sealing surface around the space housing the wheel.

Further, the top section and the bottom section of the handset 800 may incorporate snap fit features 810, to provide clamping force to compress the rubber gaskets to ensure a proper seal. For example, as shown in FIG. 8, snap fit features 810 may be disposed at 4 corresponding points in the top section and the bottom section, with features in the bottom second and the top section being adaptively shaped to ensure the snap fit engagement.

An example control handset, in accordance with the present disclosure, may comprise a top section and a bottom section configured to engage one another to form an enclosure, with each of the top section and the bottom section comprising protrusions into the enclosure of the control handset once formed, at least some of the protrusions are configured to line up to define one or more internal chambers within the enclosure of the control handset, and with the one or more internal chambers comprising at least one internal chamber configured for housing an input element that extends at least partially through the top section into an exterior of the control handset. The control handset comprises or incorporates one or more mitigating features for mitigating fluid ingress into the enclosure, via an opening that corresponds to the input element.

In an example implementation, the input element comprises rotational-based input element.

In an example implementation, the one or more mitigating features comprise an overlaying engaging component incorporated into one or both of the top section and the bottom section.

In an example implementation, at least a portion of the overlaying engaging component is incorporated into at least a portion of an external edge or a protrusion of one of the top section and the bottom section, and configured for overlapping at least a corresponding portion of an external edge or a protrusion of other one of the top section and the bottom section.

In an example implementation, at least a portion of the overlaying engaging component is configured to overlay onto the at least one internal chamber for the input element in the control handset.

In an example implementation, the one or more mitigating features comprise a seal incorporated into at least in a portion of a contact surface between the top section and the bottom section.

In an example implementation, the portion of the contact surface comprises a wall between the at least one internal chamber for the input element in the control handset and at least another one of the one or more internal chambers within the control handset.

In an example implementation, the one or more mitigating features comprise one or more holes incorporated into the bottom section, to allow flow of fluids by force of gravity.

In an example implementation, at least one of the one or more holes is in a part of the bottom section corresponding to the at least one internal chamber for the input element in the control handset.

In an example implementation, the top section comprises a defined area for implementing one or more other input elements that do not extend onto an interior of the control handset. The one or more other input elements may comprise button-based input elements.

In an example implementation, the control handset comprises an elastomer overlay applied to the defined area for implementing the one or more other input elements.

In an example implementation, the one or more mitigating features comprise a sealing surface and a corresponding mating gasket configured to mate with the sealing surface.

An example control handset, in accordance with the present disclosure, may comprise an enclosure, an input device within a first internal chamber of the enclosure, wherein at least a portion of the input device extends external to the control handset through an opening in a side of the control handset, and circuitry configured to generate a control signal representative of an input via the input device, wherein the circuitry located within a second internal chamber of the enclosure that is physically separated from the first internal chamber. The control handset incorporates or comprises one or more mitigating features for mitigating fluid ingress into the enclosure, at least via the opening.

In an example implementation, the one or more mitigating features comprise one or more openings in at least one other side of the control handset, configured to permit fluid within the first internal chamber to drain from the enclosure.

In an example implementation, the one or more mitigating features comprise an overlaying engaging component incorporated into at least a portion of one or both of an external side of the control handset or a wall between an internal chamber in the control handset and at least one other internal chamber within the control handset.

In an example implementation, the one or more mitigating features comprise a seal incorporated into at least a wall between an internal chamber in the control handset and at least one other internal chamber within the control handset.

In an example implementation, the one or more mitigating features comprise a sealing surface and a corresponding mating gasket configured to mate with the sealing surface.

In an example implementation, the input device comprises a rotational-based input element.

Other implementations in accordance with the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various implementations in accordance with the present disclosure may be realized in hardware, software, or a combination of hardware and software. The present disclosure may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various implementations in accordance with the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. For example, block and/or components of disclosed examples may be combined, divided, re-arranged, and/or otherwise modified. In addition, many modifications may be made to adapt a particular situation or material to the teachings of the present disclosure without departing from its scope. Therefore, it is intended that the present disclosure not be limited to the particular implementation disclosed, but that the present disclosure will include all implementations falling within the scope of the appended claims.

What is claimed is:

1. A control handset, comprising:
a top section and a bottom section configured to engage one another to form an enclosure, wherein:
each of the top section and the bottom section comprises protrusions into the enclosure of the control handset once formed;
at least some of the protrusions are configured to line up to define one or more internal chambers within the enclosure of the control handset;
the one or more internal chambers comprise at least one internal chamber configured for housing an input element that extends at least partially through the top section into an exterior of the control handset, wherein the input element configured to facilitate user input based on movement of the input element in response to an interaction by a user;
the one or more internal chambers comprise at least one other internal chamber, the at least one other internal chamber configured to house a mechanism configured to enable or facilitate the movement of the input element; and
the control handset comprises or incorporates one or more mitigating features for mitigating fluid ingress into the enclosure, via an opening that corresponds to the input element.

2. The control handset of claim 1, wherein the input element comprises rotational-based input element.

3. The control handset of claim 1, wherein the one or more mitigating features comprise an overlaying engaging component incorporated into one or both of the top section and the bottom section.

4. The control handset of claim 3, wherein at least a portion of the overlaying engaging component is incorporated into at least a portion of an external edge or a protrusion of one of the top section and the bottom section, and configured to overlap at least a corresponding portion of an external edge or a protrusion of other one of the top section and the bottom section.

5. The control handset of claim 3, wherein at least a portion of the overlaying engaging component is configured to overlay onto the at least one internal chamber for the input element in the control handset.

6. The control handset of claim 1, wherein the one or more mitigating features comprise a seal incorporated into at least in a portion of a contact surface between the top section and the bottom section.

7. The control handset of claim 6, wherein the portion of the contact surface comprises a wall between the at least one internal chamber for the input element in the control handset and at least another one of the one or more internal chambers within the control handset.

8. The control handset of claim 1, wherein the one or more mitigating features comprise one or more holes incorporated into the bottom section, to allow flow of fluids by force of gravity.

9. The control handset of claim 8, wherein at least one of the one or more holes is in a part of the bottom section corresponding to the at least one internal chamber for the input element in the control handset.

10. The control handset of claim 1, wherein the top section comprises a defined area to implement one or more other input elements that do not extend onto an interior of the control handset.

11. The control handset of claim 10, wherein the control handset comprises an elastomer overlay applied to the defined area to implement the one or more other input elements.

12. The control handset of claim 1, wherein the one or more mitigating features comprise a sealing surface and a corresponding mating gasket configured to mate with the sealing surface.

13. A control handset, comprising:
an enclosure;
an input device within a first internal chamber of the enclosure, wherein at least a portion of the input device extends external to the control handset through an opening in a side of the control handset, the input device configured to facilitate user input based on movement of the input device in response to an interaction by a user;
a movement mechanism within second internal chamber, wherein the movement mechanism is configured to enable or facilitate the movement of the input element; and
circuitry configured to generate a control signal representative of an input via the input device;
wherein the circuitry is located within a third internal chamber of the enclosure that is physically separated from the first internal chamber;
wherein the control handset comprises one or more opposite openings on an opposite side relative to the side of the control handset where the opening is disposed, to expel of fluids that ingress through the opening; and
wherein the control handset comprises or incorporates one or more mitigating features to mitigate fluid ingress into the enclosure, at least via the opening.

14. The control handset of claim 13, wherein the one or more mitigating features comprise one or more openings in at least one other side of the control handset, configured to permit fluid within the first internal chamber to drain from the enclosure.

15. The control handset of claim 13, wherein the one or more mitigating features comprise an overlaying engaging component incorporated into at least a portion of one or both of an external side of the control handset or a wall between an internal chamber in the control handset and at least one other internal chamber within the control handset.

16. The control handset of claim 13, wherein the one or more mitigating features comprise a seal incorporated into at least a wall between an internal chamber in the control handset and at least one other internal chamber within the control handset.

17. The control handset of claim 13, wherein the one or more mitigating features comprise a sealing surface and a corresponding mating gasket configured to mate with the sealing surface.

18. The control handset of claim 13, wherein the input device comprises a rotational-based input element.

* * * * *